Aug. 18, 1970 G. J. DOUNDOULAKIS ET AL 3,524,545

APPARATUS FOR RANDOM FILING AND RETRIEVAL OF CODES ITEMS

Filed April 30, 1968 8 Sheets-Sheet 1

INVENTORS
GEORGE J. DOUNDOULAKIS
ARTHUR DOULOS

BY
Constantine A. Michalos
ATTORNEY

APPARATUS FOR RANDOM FILING AND RETRIEVAL OF CODES ITEMS

Filed April 30, 1968 8 Sheets-Sheet 2

INVENTORS
GEORGE J. DOUNDOULAKIS
ARTHUR DOULOS
BY
Constantine A. Michalos
ATTORNEY INVENTORS
GEORGE J. DOUNDOULAKIS
ARTHUR DOULOS
BY
Constantine A. Michalos
ATTORNEY INVENTORS
GEORGE J. DOUNDOULAKIS
ARTHUR DOULOS
BY
Constantine A. Michalos
ATTORNEY

Aug. 18, 1970 G. J. DOUNDOULAKIS ET AL 3,524,545

APPARATUS FOR RANDOM FILING AND RETRIEVAL OF CODES ITEMS

Filed April 30, 1968 8 Sheets-Sheet 5

INVENTORS
GEORGE J. DOUNDOULAKIS
ARTHUR DOULOS
BY Constantine A. Michalos
ATTORNEY INVENTORS
GEORGE J. DOUNDOULAKIS
ARTHUR DOULOS
BY
Constantine A. Michalos
ATTORNEY INVENTORS
GEORGE J. DOUNDOULAKIS
ARTHUR DOULOS
BY
Constantine A. Michalos
ATTORNEY INVENTORS
GEORGE J. DOUNDOULAKIS
ARTHUR DOULOS
BY
Constantine A. Michalos
ATTORNEY United States Patent Office 3,524,545
Patented Aug. 18, 1970

3,524,545
APPARATUS FOR RANDOM FILING AND RETRIEVAL OF CODES ITEMS

George J. Doundoulakis, 2498 Kayrone Lane, North Bellmore, N.Y. 11710, and Arthur Doulos, 2346 19th St., Brooklyn, N.Y. 11218

Filed Apr. 30, 1968, Ser. No. 725,288
Int. Cl. B07c *3/16*
U.S. Cl. 209—80.5 9 Claims

ABSTRACT OF THE DISCLOSURE

This invention relates to a system for selecting predetermined cards from a plurality of cards wherein the cards have at one edge an electromagnetic material that is attracted by means of a magnetic field device which passes by the cards. The cards include predetermined address slots while the magnetic field device includes vanes which can be positioned as desired to align with the slots of cards to be selected so that when the magnetic field device also providing the vanes passes by the cards, the vanes will hold back the non-selected cards while the selected cards having their slots aligned with the vanes will move by the attracting force of the magnetic field device toward a position for retrieval.

The present invention relates to selector devices and methods and more particularly to an apparatus adapted to select predetermined cards and the like from a plurality or stack of cards and the like; where the card generically connotes an individual sheet or component of a filing system or similar information-storage apparatus.

Heretofore, various types of card-sorting devices have been evolved throughout the years for enabling the separation of cards containing a common predetermined coded address. In one widely-used system stacks of coded cards which have a predetermined common characteristic in their coded address are run through a sorter which examines each card in turn and retrieves these predetermined common characteristic cards. Such a system requires high-speed precision parts and complex feeding arrangements; it also requires the cards to be uniform to within high precision to avoid jamming of high-speed parts of the system.

Other prior card-sorting devices have employed rods, thin strips, or other types of digit elements passing through openings which are located along the bottom or top edge of the cards; whereby the cards having a predetermined combination of openings are separated from the rest of the cards. Such systems are, however, subject to the disadvantage of requiring long, straight elements when a substantial number of cards need to be handled. Since an edge of the card provides only a limited length to be shared among the numerous digits required to provide a large number of combinations, in practice, the available spacing between digit elements is small and of the order of one-eighth of an inch. As a consequence, the digit elements have to be thin and of the order of one thirty-second to one-sixteenth of an inch, a requirement which is incompatible with long length. Conversely, as the thickness of the digit elements is increased approaching the size of a digit slot of the card edge, higher tolerance in the uniformity of the cards and the accuracy of positioning of the digital slots on the cards becomes necessary. Then a force is needed to be exerted on the cards towards the digit elements, preferably over one ounce per card. The total force, therefore, exerted by the cards on the digit elements can amount to a substantial bending movement of several hundred pounds-feet. The requirement of rigidity for the digit elements to withstand said force, superimposed on the requirements of long length and thin cross section are incompatible. For this reason, card sorting systems have in the past been restricted to short lengths, of the order of three feet long, thus also restricting the number of cards which can be handled by the apparatus.

It is therefore an object of the present invention to provide improved sorting means capable of storing various sizes of cards at relatively high speed without the need of high speed moving parts or high precision cards.

It is therefore another object of the present invention to provide a filing and retrieval system which while of non-limited length, requires only a short length of code elements and in which only a force by a relatively few cards is exerted at any one time in the code elements. The present invention thus can use very thin code elements allowing greater number of digits over the same length of card edge while the demands of high tolerance on the uniformity of cards and the positioning of code slots are reduced.

In addition, the majority of the system proposed for sorting edge-notched cards have employed the binary code. According to this base code, each position of the code represents a digit. Each digit possesses only two symbols. One symbol is expressed by cutting the particular position of the digit, while the second symbol is expressed by not cutting the position corresponding to another particular digit.

The drawback of the binary code is that it requires a relatively large number of digits to express a number other than another code referring to a larger base. Thus, while the number 1,000 requires only four digits when expressed in the base 10 code, the same number requires 10 digits when expressed in the binary code. For this reason it has been found necessary in the sorting systems previously proposed to provide for automatic means for the coding of cards and for setting an address into the card sorting apparatus.

In a co-pending application, Ser. No. 498,757 invented by the same inventor, there is described a novel method of alphanumeric coding. In this method, the letters of the alphabet are distributed into several fields in accordance with chosen, frequently-occurring characteristic letters which are used to introduce each field. This method of coding is named as a "multiple field sequential coding." In the application Ser. No. 498,757 there is also shown electromechanical means for setting up a card address in accordance with the multiple field sequential coding method. The advantage of the multiple field sequential coding method is that a large number of digits may be employed, yielding a very large number of independent combinations. Thus a five field code with each code using fourteen digits contains seventy digits, yielding $10^{22}$ independent combinations. The beginning of a word plus four vowels such as A, E, O and I are used as characteristic letters to introduce the five fields. The remaining letters of the alphabet are then selected according to which characteristic letter is preceding them. In this manner when use is made of a standard typewriter keyboard with electromechanical means the descriptive words making up an address may be typed in any order, in natural language, for coding or retrieving a card. The method also yields different addresses for words containing the same letters, such as "flow" and "wolf."

In the majority of the previously proposed card sorting systems, the retrieval of the desired cards takes place in two distinct steps. During the first step the desired card is allowed to be slightly displaced parallel to one edge or be tilted about one of the corners; then during the second step the card is hooked out of this position. Such systems are subject to the disadvantage of requiring special hooks on the cards and of involving complicated mechanisms.

Besides, the process of tilting the card requires higher precision of both card uniformity and position of code slots because the slots near the card corner about which the card is rotated are only slightly displaced. Unless great precision prevails in the equipment and cards, a large number of digit slots near the axis of rotation are ineffective and provided the digit slots away from the axis of rotation are cut in accordance with the desired combination, the card is usually retrieved regardless of whether the digits near the axis of rotation are cut or not cut.

It is therefore an object of the present invention to provide improved sorting means capable of sorting various sizes of cards at relatively high speed without the need of high speed moving parts or high precision cards.

Another object of the present invention is to provide a filing and random retrieval apparatus capable of handling simultaneously various sizes of cards.

Another object of the present invention is to provide for a sorting apparatus based on a code of base greater than two and preferably the decimal code, whereby only a few notches are needed to be cut for addressing a card and the symbols of only a few digits need be adjusted during retrieval of a card.

Still another object of the present invention is to provide a simplified electromechanical means whereby a card address, while being typed in natural language, can be automatically translated into positioning of the proper code elements in accordance with the multiple field sequential coding methods.

A further object of the present invention is to provide simplified means for displacing the desirable cards in a single step from the other cards and to do so by a translation of the card normally to the coded edge of the card without the need for tilting the card, so that all digits become equally effective in the selection of the card.

Another object of the present invention is effective means for simultaneously setting and operating a multiplicity of filing spaces for the search and retrieval of cards coded by a particular desired address.

Another object of this invention is to provide for a simple and efficient means for coding media, such as a typewriter-arranged keyboard with control switch buttons setting the code combinations within the system.

Other objects and features of the invention will appear in the description of the particular physical embodiments selected to illustrate the invention. In the drawing which forms part of this specification, like reference characters have been applied to corresponding parts.

In the preferred embodiment of this invention a file and card retrieval apparatus of the present invention includes in combination a plurality of cards and the like, each provided with a strip of high permeability material along preferably the long edge, and a plurality of indicia along the same edge thereof. The indicia is coded to provide notches at different preselected positions on the edges of each card that is distinct from those of the other cards thereof. There is provided one or more filing shelves for holding a plurality of cards in an upright position and a carriage comprising adjustable code elements extending along the indicia in each card, and relatively short magnets for exerting attractive force on said high permeability strips attached to the cards opposite the short magnet.

In addition, there are provided means for transporting the carriage carrying the code elements and the attracting magnets along the face of the shelf holding the cards; while the non-pertinent code elements are kept aligned at a fixed distance from the surface formed by the front edge of the cards and the checked elements are kept aligned along the surface formed by the front edge of the cards, also containing the high permeability strips and the coded indicia. Whereby as the carriage passes over each card the card is attracted by the magnets in the carriage while the code elements prevent all but the cards coded by some predetermined combination which is represented by the position of the code elements to be displaced forward towards the carriage. As the carriage proceeds along the length of the shelf the chosen cards follow an outward bevel at the end of the code elements and are thus brought at a distance forward from the remaining cards. Thus in one step the desirable cards are chosen and displaced forward from which position they may be retrieved by the operator. Preferred details and constructional refinements are hereinafter explained.

Figures 1, 2:
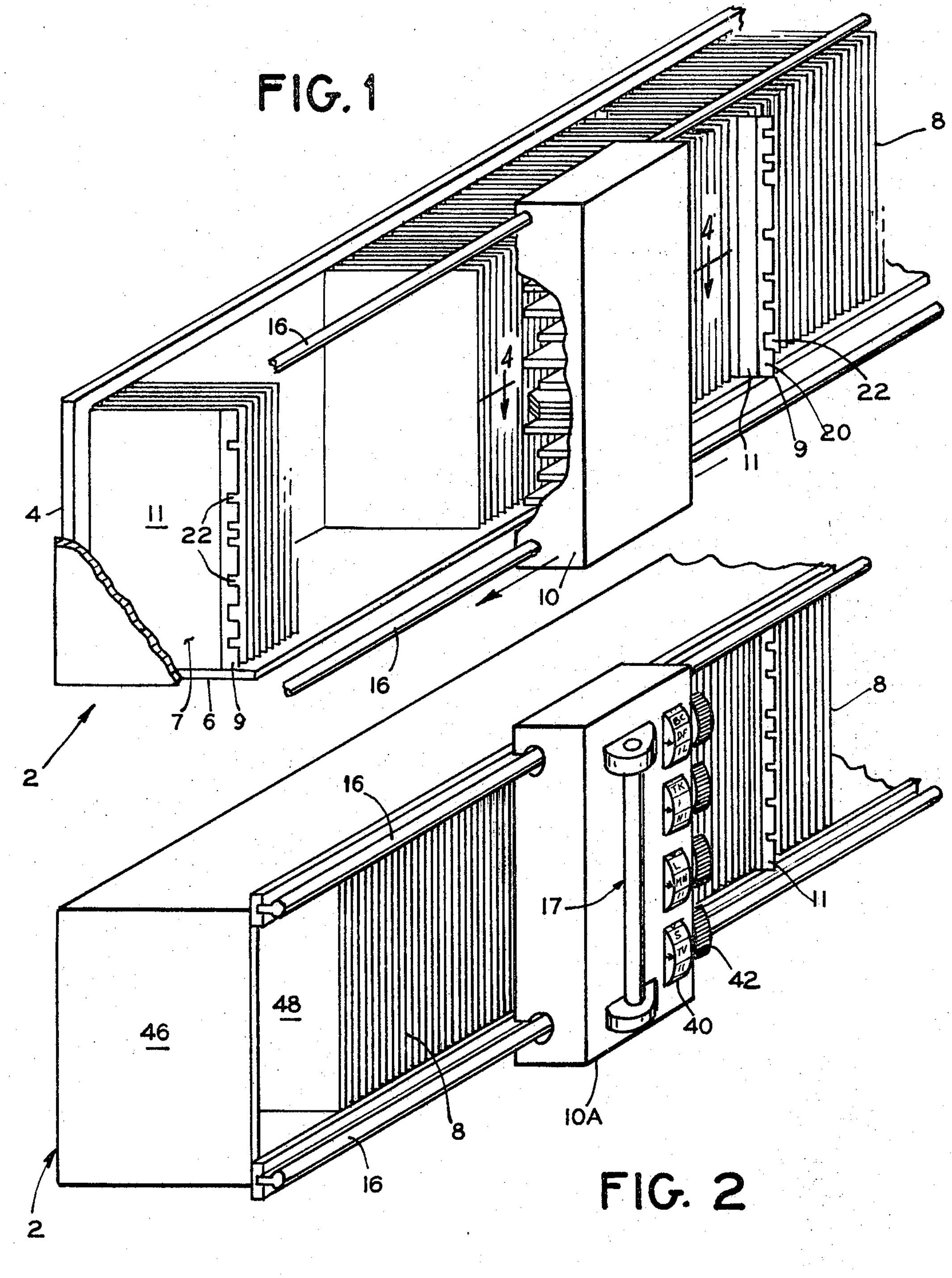
FIG. 1 is a perspective fragmentary view showing the main components in accordance with a preferred embodiment of the invention.
FIG. 2 is a perspective view showing the first embodiment of the invention which includes a hand-operated mechanical apparatus.

Referring now particularly to FIG. 1, the invention provides for a shelf-like structure 2 comprising a horizontal base board 6 and a vertical rear plate 4. The shelf serves to support and align a plurality of cards 8 with the faces 7 of the cards 8 parallel to each other and at planes substantially normal to the intersection of the base 6 and the plate 4. A front edge 9 of each card has attached to it a thin strip 20 made out of ferromagnetic material. The same edge 9 is provided with notches 22 in accordance with a predetermined code. Although the thin ferromagnetic material is only needed on a few spots, at predetermined locations along the edge 9 of each card, it is preferable that the ferromagnetic strip 20 extend along the entire length of the edge 9 to provide additional rigidity. In this case the notches 22 are cut through both the thin strip 20 and the material on the edge 9 of the card.

It should be understood that the cards may be made of cardboard material or any suitable rigid or semi-rigid material. As in the case in all other random access storage equipment using edge-notched cards, the present invention divides the coded edge 9 into a predetermined number of equal intervals. Each interval corresponds to a predetermined digit or symbol of the code. When the binary code is employed each digit corresponds to a particular interval. The two symbols possible in a binary code are rendered on an edge-coded card by cutting (or not cutting) a notch at predetermined locations along the edge 9 corresponding to a particular digit. Although the edge-notched systems were restricted to the binary code the embodiments of the present invention extend the use of the edge-notched coding to codes involving bases much greater than two. In this case a digit involves more than a single interval along the edge of the card and actually a number of intervals equal to the base of the code.

For one alphanumeric notation the invention is presented to employ the base ten code in which case each digit comprises ten intervals along the edge of the card and each interval having assigned to it a particular symbol of the code. For the base ten code the intervals are assigned to the symbols 1, 2, 3 . . . 0. The presence of a particular symbol in the code address is then rendered by cutting a notch in the corresponding length interval along the edge of the card.

The intervals assigned to a particular digit may also be assigned to represent letters of the alphabet and preferably groups of letters. Since each letter of the alphabet has its own frequency of occurrence in a language, it is possible to group letters in such a way as to even up the probability of occurrence of any group of letters. If each interval were to be assigned to a single letter, the intervals belonging to frequently-occurring letters such as E and T would be notched in practically every address while intervals belonging to rarely occurring letters, such as the letters Q, X and Y, would very seldom be found checked in an address. The discriminating efficiency of an interval is reduced equally when it has a very high probability of being checked as when it has a very low probability of being checked. When a group of letters is assigned to each card edge length interval the probability of each interval being notched is equal to the sum of the probabilities of the letters contained in the group. Thus, by assigning predetermined grouping of letters to symbols the probability of any interval being notched in a random address is evened out.

Figure 4:
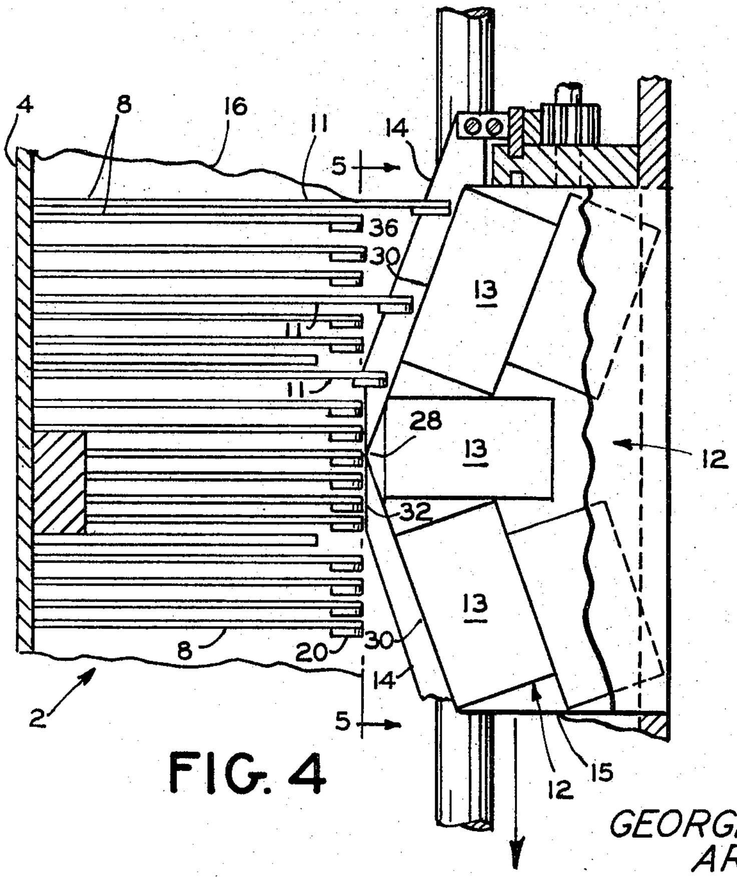
FIG. 4 is a cross section plan view of the apparatus shown in FIG. 1 demonstrating the interaction of the cards by magnets and the guidance of the chosen cards by the code blades taken on line 4—4.
Figure 5:
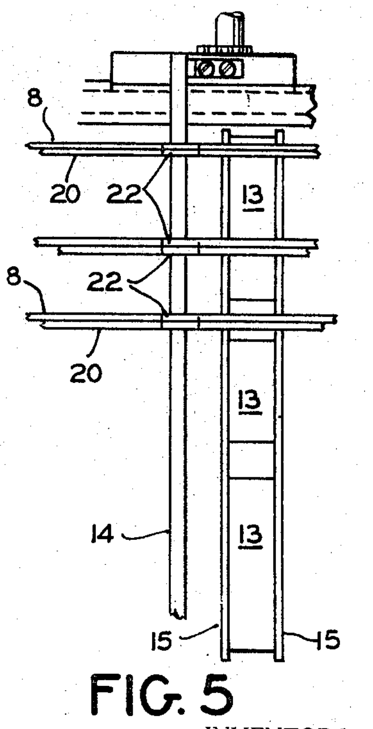
FIG. 5 is a cross sectional side view of the portion of the apparatus taken on line 5—5 of FIG. 4.

As in the case of the other random access storage equipment employing edge-notched cards, the present invention, as best shown in FIGS. 1, 4 and 5, also uses code blades 14 which contact and pass against the coded edges of the cards 8 to match the combination of the notches 22 on the desired card or cards to the combination in which the position of the code blades 14 is set. The code blades 14 are run in a direction normal to the coded edge of the cards. A force is exerted by forcing means 12 having a plurality of magnets 13 on all cards toward the code blades, whereby the cards whose notch combination matches that of the code blades 14 are displaced towards the code blades 14, while the cards whose notch combination does not match that of the code blades 14 are prevented from doing so by the blade 14.

The heretofore random access devices employed such code blades and force along the entire length of the storage unit, while the present invention provides only for short code blades and short forcing means. In the present invention the code blades 14 are movable with the forcing means 12 along the length of the shelf in a carriage selector box 10.

In one embodiment using a high base code requiring only one blade per digit a few code blades 14 are needed. In this case it has been found convenient for the system to have blades movable vertically in discrete steps while remaining normal to the coded edge of the cards.

In a second embodiment where any edge interval may require a code blade, the code blades 14 have two positions, one flush with the coded edge of the cards and the other a predetermined distance away.

The present invention preferably provides a magnetic field causing the selected cards to be displaced towards the code blades. One or more short magnets may be employed. Since the magnetic field in the present invention need only be restricted to a short distance along the length of the shelf 2, high-strength fields may be easily and inexpensively achieved. Thus, with three small permanent magnets 13 used in conjunction with plates of high permeability, force as high as five ounces per card has been experimentally accomplished. One or more electromagnets alone or in combination with permanent magnets may be employed. The advantage of electromagnets is that if they are operated with alternating current power, they provide an alternating current magnetic field which tends to impart a vibratory force on the cards. This is desirable since it helps loosen up the strictional friction forces between cards. This, however, is not necessary and as previously mentioned, the field from permanent magnets can supply satisfactory operation.

The carriage selector box 10 is movably guided along the length of the shelf 2 by guiding means 16. The box 10 is supported by the guiding means 16 at preferably three points. While the guiding means 16 is shown in FIG. 1 and subsequent figures to be a combination of two rods and split sliding bearings, other guiding means such as channel and roller combinations may provide equally satisfactory performances.

The selector 10 may be displaced along the shelf 2 either manually or electrically, as for example, by a rack and pinion arrangement. As the carriage box selector 10 is being displaced along the length of the shelf 2, successive groups of cards are sampled. The interaction between the selector 10 and the cards 8 may be better explained by referring to FIGS. 4 and 5. The magnetic field is supplied by the magnets 13 in between plates 15 made out of high permeability material. The plates 15 are tapered towards the cards 8, forming an apex 28 for serving to taper the magnetic field with a maximum at the apex 28 and for diminishing the magnetic field on either side. The code blades 14 are also tapered away from the apex 28 but they present to the cards a straight portion 32 at the region of the apex 28. The apex 28 does not necessarily have to touch the field cards and may be positioned at a convenient distance from the field cards depending on the strength of the magnetic field. The straight portion 32 of the code blades 14 serves to hold the cards from being displaced that have combinations different from cards having combinations notched at the edge of the cards that are selected. That is, the cards containing notches directly opposite the code blades 14 are allowed to be displaced under the influence of the magnetized plates 15 on the thin strip 20. More clearly, as the carriage 10 moves in the direction indicated by arrow 34, the notches 22 of displaced cards, such as cards 11, slide over edges 36 of the code blades 14, while edges 30 of the magnetized plates 15 provide substantially constant magnetic attraction. In this manner the displaced cards 11 may be displaced outwardly from the shelf 2, to any desirable distance to become clearly visible to the operator for removal of blades. If desired, an additional magnet not shown, located outside the selector box 10, may serve to further displace the selected cards outwardly.

The shelf 2 shown in FIGS. 1 and 2 may take several forms. FIG. 2 shows the shelf 2 in a first embodiment comprising a random access storage apparatus 45 including a housing 46 in which the cards 8 are filed vertically inside the housing 46. The selector carriage 10A is supported by the guiding means 16 and has a handle 17 by means of which it can be easily moved by the operator over the length of the housing 45 of the random access storage apparatus 46. The selector 10A shown in FIG. 2 comprises only a relatively small number of code blades, in this case, four blades 14.

Figure 8:
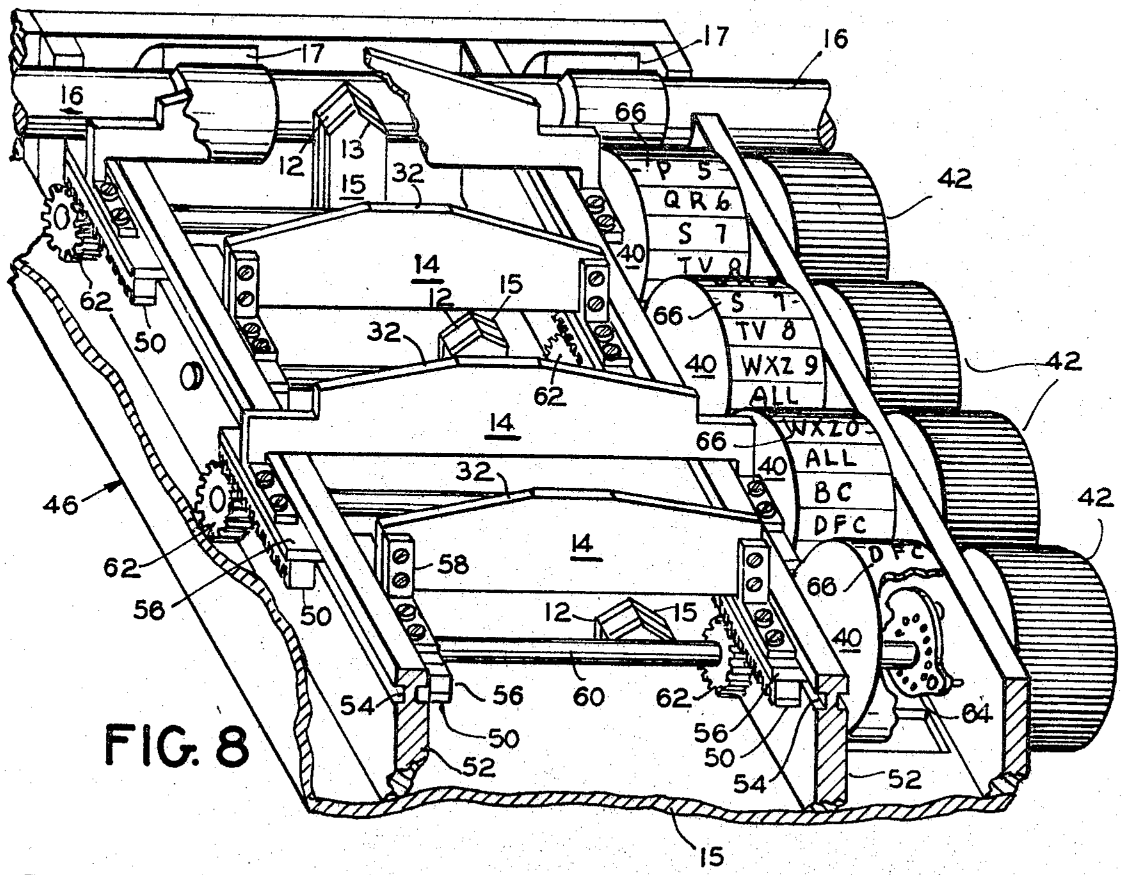
FIG. 8 is a fragmentary perspective view of the card selector used in conjunction with the first embodiment of the invention.

A detailed description of the selector 10A is shown in FIG. 8. The code blades 14 are shown lying on planes normal to a front cover 18 of the selector 10A. Each blade 14 is supported by a pair of sliders 56 which in turn are movably positioned in grooves 54 of vertical support bars 52. The pair of sliders 56 are rigidly attached to a pair of gear racks 50, operated by a pair of pinion gears 62. As the pair of pinion gears 62 are rotated, the pair of rack gears 50 move in unison, forcing the pair of sliders 56 to be displaced along the grooves 54. The code blade, attached to the pair of sliders 56, is equally forced to be displaced along the length of the supporting bars 52. The pair of pinion gears 62 are rigidly attached to shafts 60 which are rotated manually by knobs 42. A detent-action unit 64 permits only constant predetermined rotational angles of shafts 60. In this manner, the code blades 14 attain particular predetermined position corresponding to the symbol intervals of the notches 22 of the cards 8.

Cylinders 40 are coaxially attached to and movable with the shafts 60. The cylinders 40 include circumferential ribbons 66 which are coded and divided into intervals, each displaying the alphanumerical group of each angular position of the shafts 60 and therefore the position of the corresponding code blade 14. It may be noted that when a decimal code is employed four code blades provide for 10,000 independent combinations and when five code blades are used they will provide 100,000 such combinations.

It should be noted in FIG. 8 that alternately pairs of inside and outside grooves 54 are used to avoid mechanical interference. In this manner at the extreme positions a code blade is permitted to come to the immediate vicinity and to within one interval of either of the adjacent code blades. In addition, FIG. 8 also shows the supporting guiding means 16 in combination with a pair of split bearings 57 which slidably support the housing 46 onto the guiding means.

Figure 6:
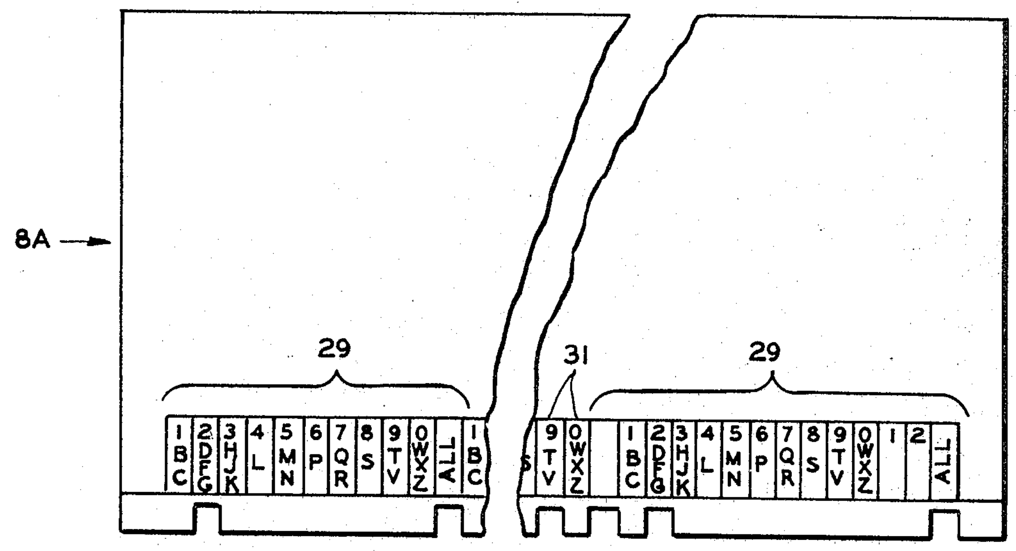
FIG. 6 is a fragmentary plan view of the typical card employed in conjunction with the first embodiment of the invention.

FIG. 6 shows a section of a typical card 8A used in conjunction with the first embodiment just described. The coded edge of the card 8A is subdivided into a small number of fields 29 which may also be viewed as digits. Further, each digit interval is subdivided into a number of sub-intervals 31 corresponding to the symbols of the digit. FIG. 6 shows the card 8A to be sub-divided into a number of decimal digits 29 each having ten symbols 31 and one digit having a base code of twelve, therefore comprising twelve symbols. Each symbol is assigned an alphanumeric grouping. The last digit has been assigned the base of twelve to help indicate a month in a year. It may be noted that only consonants have been included in this alphanumeric grouping. The reason for this is that the vowels occur too frequently and therefore have very little discriminating power.

The alphanumeric grouping helps to code cards either by number or by letter. Assuming that, for example, a drugstore is using a random access system as described by the first embodiment and further assuming that one of the cards has been coded to cover the account of a GEORGE PETERS, the cards shown in FIG. 6 provide a notch on the initial of the first name G, and also notches corresponding to the first two consonants of the surname, P and T. The first consonant G is shown cut as a notch under G or the first field. The second letter P is not shown because the second field of the card is not shown in FIG. 6. The third consonant T is shown cut as a notch under T of the third field. The fourth digit may be reserved for the billing period and shows the number two cut indicating February. An additional sub-interval is provided with each digit designated ALL. The sub-interval is always notched. When the code blade is positioned over this interval the entire field preceding this sub-interval is neutralized.

Thus, if the druggist desires the card of Mr. Peters but does not remember the first name or the billing period, he may retrieve all the cards coded as PETERS by dialing P and T in the second and third fields and "ALL" in the first and fourth fields. Similarly at the end of the month when the druggist desires to send out all bills to individuals making purchases during the month, he may obtain all their cards at once by dialing ALL in the first three fields and the number of the particular month in the fourth field. Despite the fact that this method of coding may appear rudimentary, it must be realized that the conventional tedious filing systems seldom are arranged in order of more than two letters. Besides, there is no harm done if more than one card is retrieved since the desired card may easily be selected from the few retrieved cards and the undesirable cards may be dropped back into the field. This method of filing does have the features of being simple and convenient in practice. It should be noted that four or five notches are needed, a card may be easily coded manually by a handpunch. Also, the retrieving address may be easily set by dialing four or five knobs.

It may be further noted that a card may be coded by more than one address so that it will be retrieved if any one of the coded addresses is dialed. If it is desirable, cards may be addressed by numbers alone in which case this method has a definite advantage over the binary code, being immediately expressible in the decimal code in which most people are familiar.

Instead of names, shown in the previous example, subject descriptor words may be used in addressing a card. A card, for example, may be coded for the subject ANTENNA PARABOLOIDAL in the fields by notching the consonants NTPR, NT for the first two consonants in the word antenna and PR for the word paraboloidal. Another card coded as ANTENNA DISLONE would be coded by the letters NTDS. If the cards pertaining to all antennas were needed the letters NT would be dialed in the first two fields while the third and fourth fields would be dialed ALL.

Figure 9:
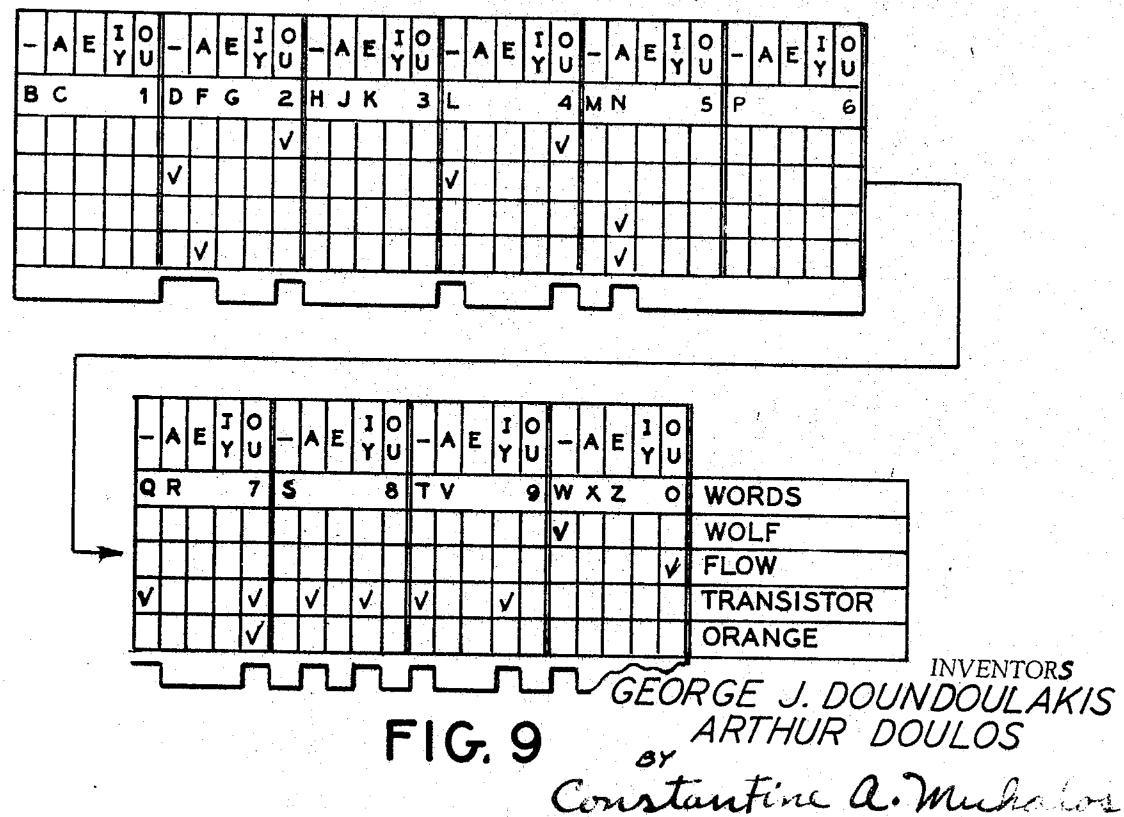
FIG. 9 is a diagram showing the principle of the multiple field sequence coding performed by the second embodiment of the invention.

The second embodiment of the invention pertains to a much more elaborate method of coding, permitting a number of descriptor words to be explicitly inserted into the code address. In this method, entitled "Multiple Field Sequence Coding," each consonant is entered in the code address, in one of a plurality of fields, according to which characteristics letter precedes the particular consonant. The space preceding a word and individual vowels or groups of vowels are employed as characteristic letters. The principle and examples of this method of coding are shown schematically in FIG. 9. The coded edge of a card is divided into a number of alphanumeric groupings. Each grouping is then further subdivided into a number of fields. FIG. 9 shows ten alphanumeric groups, BC1, DFG2, KJK3, L4, MN5, P6, QR7, S8, TV9, WXZ0, each subdivided into five fields, –, A, E, IY and OU, with the "–" referring to the space preceding a word.

A consonant is then notched in the alphanumeric grouping which contains the particular consonant and under the field space corresponding to the characteristic letter preceding it. For example, in inserting the word WOLF into an address, W is notched in the group WXZ0, under –, L and F are notched under O in the alphanumeric grouping of DFG2 and L4, respectively. The word FLOW is addressed by notches under DFG (–), L4(–) and WXZ0(O). It may be noted that despite the fact that both words WOLF and FLOW contain the same letters, a completely different address results.

The words TRANSISTOR and ORANGE are also shown coded in FIG. 9. If a card was to be addressed by all of these four words the edge of the card will be notched as shown in FIG. 9. It may be noted that by this method each combination of words results in an almost random notch distribution. A card providing five fields with ten groupings per field provides fifty digits and therefore $2^{50}$ different combinations, or approximately $3 \times 10^{16}$ combinations.

Figure 7:
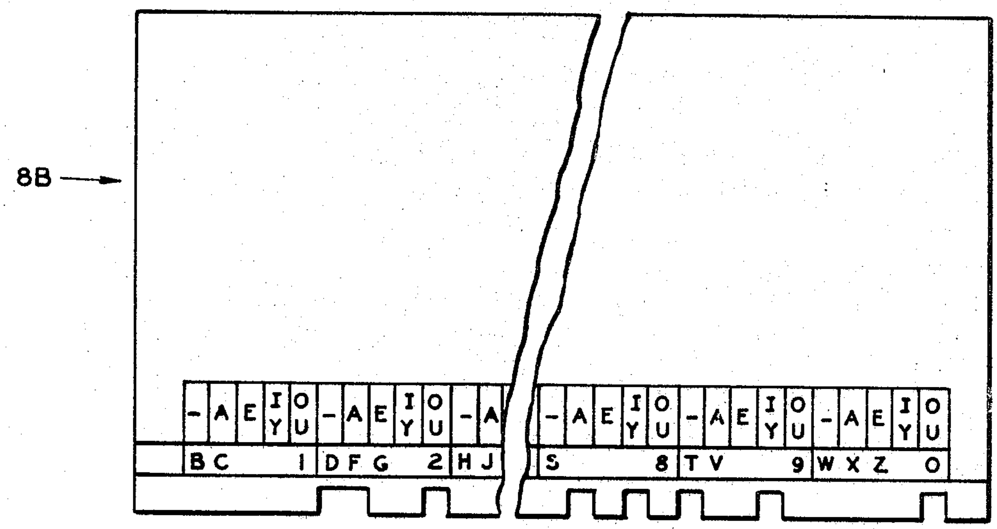
FIG. 7 is a fragmentary plan view of a typical card employed in conjunction with the second embodiment of the invention.

The randomness mentioned above is provided by the fact that the letters are grouped so that each sub-interval has almost the same probability of being notched as any other sub-interval. The discrimination of some letters is derived from the fact that when a letter is notched the inserted information exceeds the mere fact that the particular letter has occurred. Actually the information inserted combines the occurrences of a letter with the additional information that the particular letter is preceded by a particular characteristic letter. It may be also noted that the insertion of a word in an address does not alter the information already in the address by the insertion of other words. For this reason it becomes immaterial as to the order in which the descriptor words are inserted in the address. Further, as is desirable when an address is retrieved, all cards containing at least the words contained in the address are retrieved. This is so because the condition for retrieval is that opposite every code blade next to the edge of the card there is a notch and additional notches, not having code blades next to them, which do not prevent a card from being retrieved. FIG. 7 shows a typical card 8B notched by the addressed card derived in FIG. 9

Figure 3:
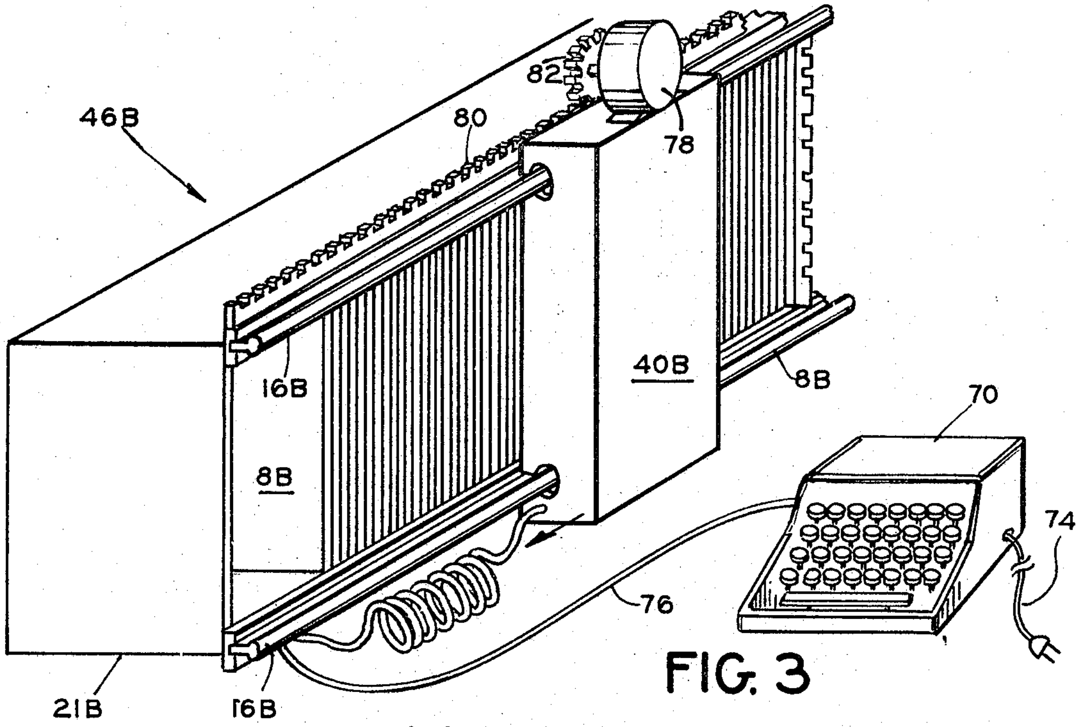
FIG. 3 is a perspective view showing a second embodiment of the invention which includes an electronically operated electromechanical apparatus.

FIG. 3 shows a variation of the second embodiment comprising a typewriter keyboard 70 which can be connected to conventional power through cord plug 74 and to random access storage apparatus 46B through conduit 76. This apparatus comprises a shelf 2B, which is substantially as shown in FIG. 2, using cards 8B shown filed in the same way as described in the first embodiment, and a selector head 10B movably supported by rod means 16B. FIG. 3 shows the selector head 10B to be electromechanically movable along the length of the shelf 2B by means of a motor 78 and a rack and pinion arrangement 80 and 82, respectively. Activating buttons for the motion of the selector head 10B may be conveniently located at the typewriter keyboard.

Figure 10:
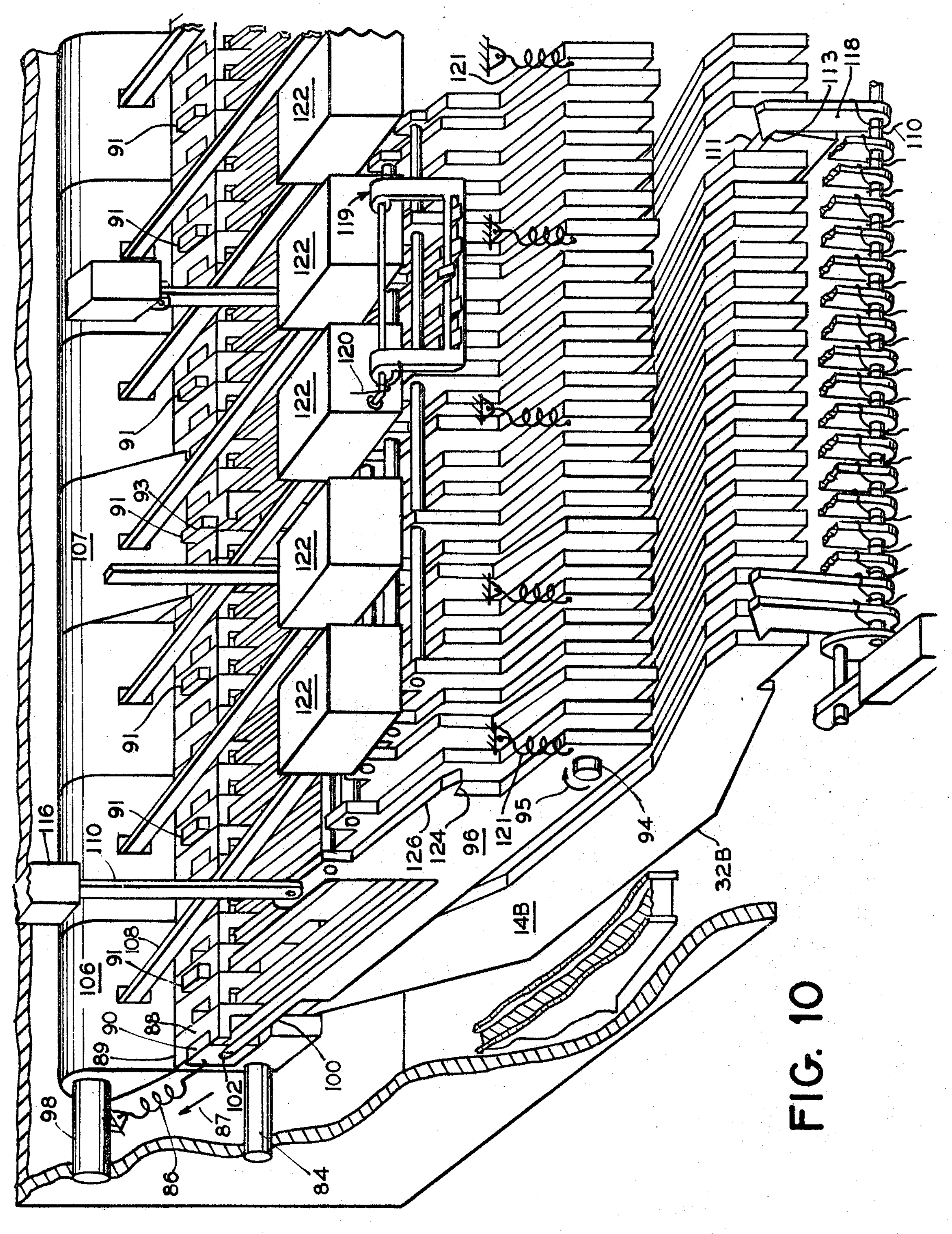
FIG. 10 is a perspective fragmentary view of the card selector used in conjunction with the second embodiment of the invention.

A detailed perspective drawing of the interal structure of the selector head 10B in conjunction with the second embodiment of the invention is shown in FIG. 10. A plurality of code blades 14B are rotatably supported by a shaft 84. Each blade 14B is rotatable about the shaft 84 towards two positions. In one position the straight edge 32B is aligned and held in the plane formed by the coded edge of the cards 8B as hereinbefore described. In the second position the straight edge 32B of the code blade 14B is extended outwardly a distance equal to or greater than the depth of the notches 22 of cards 8, shown in FIG. 1. The code blades 14B normally assume the first position under the influence of springs 86 pulling the blades 14B in the direction shown by arrow 87. The blades 14B are divided in a number of groups corresponding to the fields introduced by the characteristic letters. Five such fields are shown in FIG. 10.

Each code blade in the vicinity of the shaft 84 ends into a vertical extension 88 extending normally to the length of the blade 14B. The force for a blade 14B to be rotated is applied along a near edge 89 of its vertical extension 88. Next to the extension 88 is provided vertically slidable member 90 loosely supported in a groove cut on the side of the extension 88. Adjacent to each blade 14B is a corresponding plate 96 rotatably supported about a shaft 94. Each plate 96 is also provided with an extension 100 which is engaged with the member 90 through a slot 102 in the member 90. When the plate 96 is rotated about the shaft 94, as shown by the arrow 95, the extension 100 forces the member 90 to be displaced upwards so that its top edge protrudes over the top edge of the extension 88. Members 91 are shown in this displaced position. A swinging second member 106 is rotatably supported by a shaft 98. The member 106 is forced to swing towards the member 90 by a solenoid 122 connected to the member 106 by a rod 108. The plates 96 are forced to rotate in the direction of the arrow 95 by a solenoid 116 connected to the plate 96 by a rod 110. While plates 96 are at their normal position, activation of the solenoid 122 has no effect on the blades 14B.

For example, when one plate of the plates 96 is rotated it causes one member 93 of the members 90 to be lifted in the position shown. One member 107 of members 106 under the action of the solenoid 122 may then press against the protruding member 93 and force it forward against the extension 88 of the vane 14B to rotate the vane 14B about shaft 84 towards the coded edge of the cards.

When the top edge 111 at the extremity of the vane 14B as it is being depressed reaches a depression 113 of a catcher means 118, the latter is forced by a spring 110 towards the vane 14B to retain said vane 14B in the extended second position. A vane 117 is thus shown extended and retained by the catcher 118.

Once a group of plates 96 belonging to the same field, is rotated it is caught by a retaining means 119. Five plates 96 each belonging to a different field provide at their top edge 126 a tooth 124. When a plate 96 is rotated, the inclined surface, its tooth 124, presses the retaining means 119 away against the force of a spring 120. When the depression of the tooth is reached the retaining means 119 returns to its former position, thus engaging the displaced tooth. The displaced plate 96 is thus held displaced and, with it, the entire group of plates belonging to the same field. When a new field is introduced the retaining means 119 is again displaced as the new tooth lifts up. The moment the catcher means 118 is displaced, the previously-retained tooth escapes and the entire previous field is cancelled under the force of springs 121 attached to each plate 96. It may be noted too that the plates 96 return to their normal position when the lifted members 91 are lowered in their normal position as shown by member 90.

As the address is being typed the appropriate blades are being displaced towards the surface formed by the coded edge of the cards and are retained in this position by the catchers 118. When the address is completed, the operator presses a button, not shown, located preferably in the vicinity of the typewriter keyboard which activates motor 78, causing the selector head 10B to be displaced along the length of the shelf 2B, thus scanning the entire collection of cards and displacing the desired cards outwardly.

Figure 11:
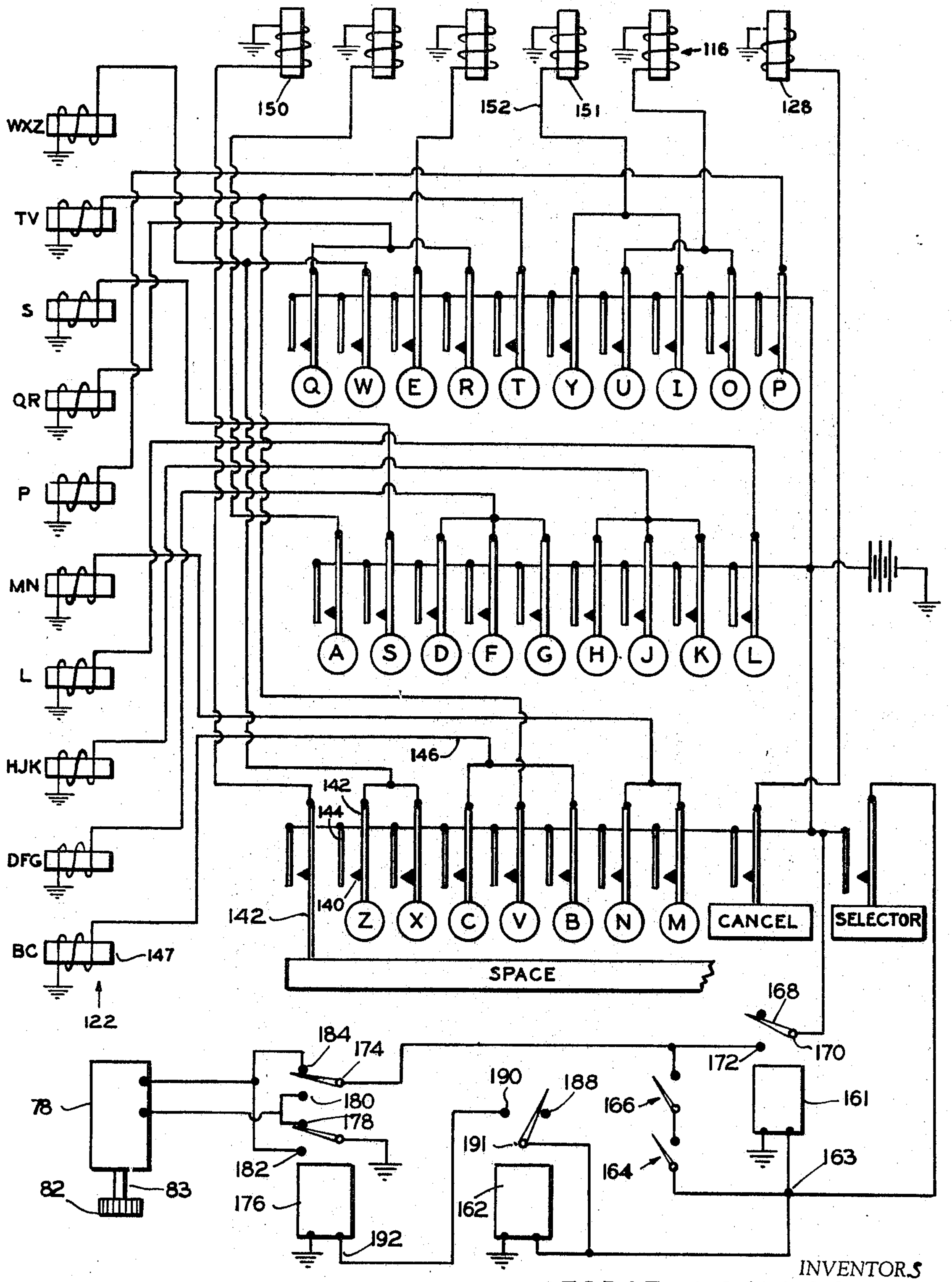
FIG. 11 is an electrical schematic diagram showing the electrical interconnection between a typewriter keyboard and the solenoids in the selector unit shown in FIG. 10.

A limit switch 166, shown only schematically in FIG. 11, serves to disconnect power from the motor 78, thus causing the carriage to stop at the end of the apparatus. Upon reactivation of the motor 78, the power is turned on and simultaneously reversed in polarity by a flip-flop relay 162 shown in FIG. 11, causing the motor 78 to rotate in the opposite direction and therefore displacing the selector in the opposite direction than before.

Before an address is typed, a special button in the typewriter keyboard clears the selector head, thus allowing all blades 14B and the catchers 118 to be returned to their normal position. The catchers 118 are forced backwards to release the blades 14B by a rod 126 extending between all catchers 118 and the blades 14B. The rod 126 is supported by lever arms 130 which in turn are rotatably supported by same shaft 132 which also rotatably supports all catchers 118. A third pair of solenoid means 128 is connected and forces the lever arms 130 to be rotated away from the blades 14B forcing the rod 126 against the catchers 118 which are caused to be slightly rotated, thus releasing all blades 14B.

The vanes 14B are arranged in groups of five, each group representing a group of consonants; while each vane in the same group belongs to one of the five fields, –, A, E, IY and OU. Each field is introduced by the typing of a particular vowel or the space key between words.

When a solenoid 116 is activated it forces all plates, such as 96, belonging to a particular field to be rotated, thus lifting all first members 91 belonging to the particular field. Subsequently, whatever consonant is typed will activate one of the solenoids 122, forcing a second member 106 to swing forward against the lifted first member such as 91 belonging to the particular consonant. The vane belonging to the particular consonant and to the field previously introduced is thus rotated. FIG. 10 also shows a solenoid 123 belonging to the consonant L activated, having a second member 107 swing forward thus also displacing forward a particular first member 93 belonging to the E field, then causing a blade 117 to be depressed towards the cards and be retained by a catcher 118.

It may be noted that each group of plates 96 belonging to the same field are rigidly attached to interconnecting rods. Thus a solenoid 116 may be connected by a rod 110 to any one of the same group of plates 96.

The electrical connections between the typewriter keyboard and the solenoids in the selector head 10B are shown in FIG. 11. To each letter and number of the typewriter keyboard there corresponds a normally open switch 140 which is closed as the letter is depressed. Each switch comprises a terminal 144 which is connected to one pole of the power supply and another terminal 140 which is connected to a solenoid in the selector head 10B. A grouping to letters is established by connecting together all switch terminals 142 of all letters belonging to a particular group. Thus, for example, to establish the group BC1, the switch terminals 142 corresponding to the letters B, C and 1 are all connected to a common lead 146 connected to the BC group solenoid 147. Ten such groupings are shown in FIG. 11 connected to the second solenoid means 122. Similarly, the five solenoid means 116 are connected to groups of vowels, which make up the characteristic letters. For example, the first characteristic letter being the spare –, the switch terminal 142 of the space key is shown connected to the first solenoid 150 of the solenoid group 116, while the terminals 142 of the switches corresponding to the letter I and Y are connected together into a single lead 152 feeding the fourth solenoid 151. The key shown in FIG. 11 wih the inscription "CANCEL" supplies current to the solenoids 128.

The circuit in the lower part of FIG. 11 controls the motion of the selector head 10B with respect to the shelf 2B. Upon completion of the type of the address, the key designated SELECTOR is depressed, causing relays 160 and 162 to be energized. The relay 160 is wired as a holding relay so that once activated it remains energized until either of the limit switches 164 or 166 opens. The switches 164 and 166 are the limit switches located at the end of the selector travel to stop the selector. When current is fed to the terminal 163 of the relay 160 the blade 168 is displaced to short terminals 170 and 172. The terminal 172 is connected through the switches 164 and 166 to the terminal 163 so that current can flow from the terminal 170 connected to the positive pole of the power supply to the terminal 163 and through the winding of the relay 160 to the other pole of the power supply, shown connected to ground. The terminal 172 is also connected to a terminal 174 of the third relay 176 which is wired to serve as a reversing relay. Ground is supplied directly to the terminal 178 of the relay 176. By shorting the terminal 182 with terminal 184 and terminals 180 and 178, and connecting the two pairs to the poles of the motor 78, the direction of rotation of its shaft 83 depends on the state of activation or non-activation of the relay 176. The state of activation of the relay 176 depends on the state of a flip-flop relay 162. Every time the selector key is depressed, blade 186 of the relay 162 flips its position from a terminal 188 to a terminal 190 whereas only the terminal 190 can supply current to the terminal 192. A terminal 191 of the relay 162 is connected to the terminal 163 of the relay 160. At the end of each run of the selector 10B along the length of the shelf 2B, the current supply to the relay 162 and to the terminal 163 of the relay 160 is discontinued by the opening of either a limit switch 164 or a limit switch 166, which are installed at each end of the shelf 2 of FIG. 2.

Figures 12, 13:
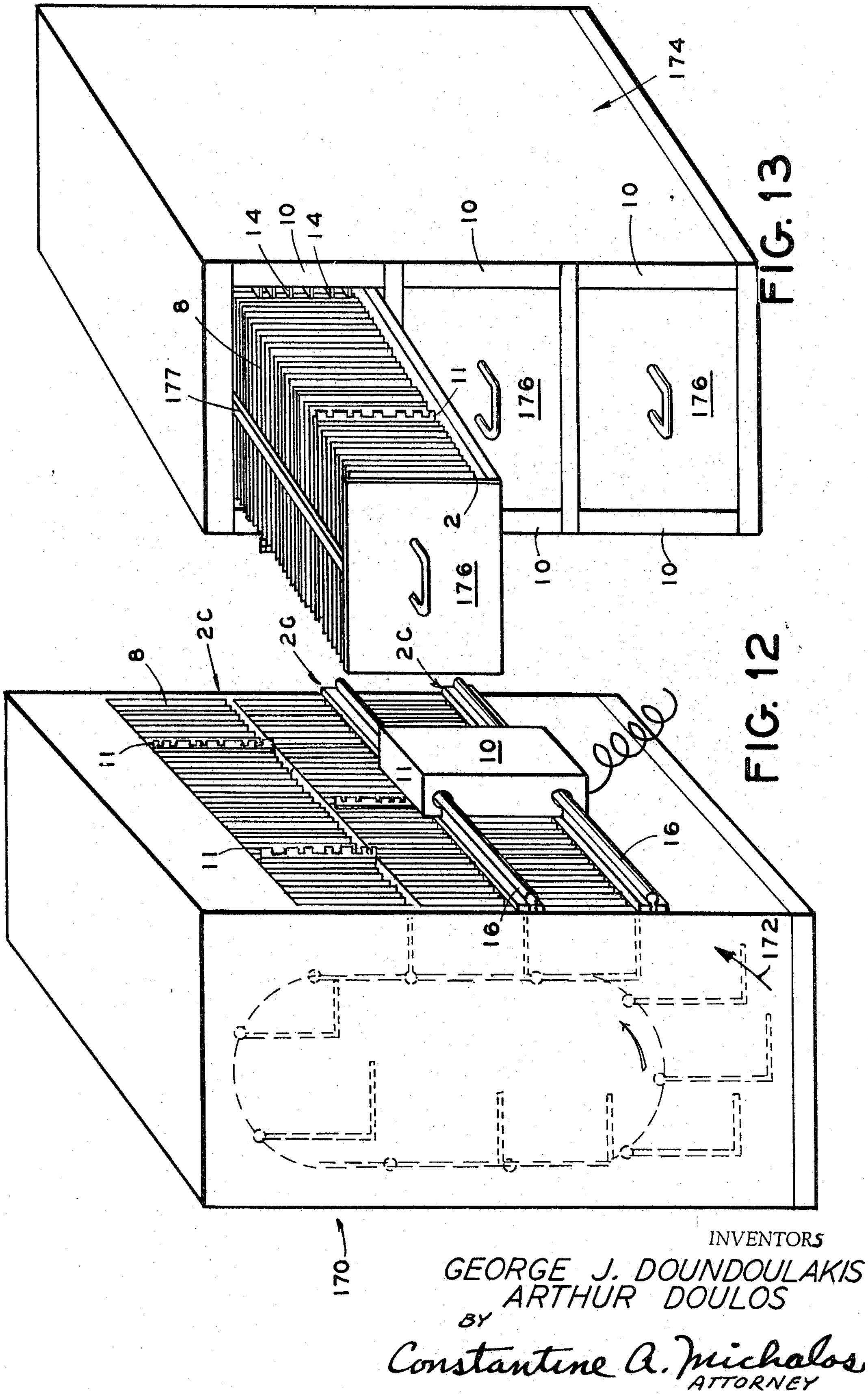
FIG. 12 is a perspective view of the invention used in combination with a rotary file.
FIG. 13 is a perspective view of the invention used in combination with a filing cabinet.

It may be noted that the shelf 2 may take various forms. FIG. 12 shows one of the species where shelves are part of a rotary file 170. Shelves 2C are attached on each side to a pair of chains inside the file 170 whereby they are kept properly positioned. An internal mechanism supplies motion to the pair of chains so that the shelves are continuously elevated on one side of the file and are descending in the opposite side of the file.

Cards 8 are shown being supported by the shelves 2C. At a particular predetermined position in front of the rotary file 170 there are guiding means 16 for supporting and guiding selector head 10. The selector head 10 may be manually or electronically operated in accordance with the first or the second embodiment of the invention. Assuming that the shelves are moving in the direction of the arrow 172, each shelf is stopped facing the selector head 10 for the interval of time needed for the selector head to scan the shelf from left to right or right to left. The internal mechanism then resumes motion of the shelves until the next shelf comes to the position where the previous shelf had stopped. At the same time, one or more of the shelves previously scanned by the selector head are now elevated into an open portion of the file. The displaced cards 11 may then be withdrawn from the file. In this manner, a single selector head may serve to process a number of shelves.

FIG. 13 shows another unit comprising a filing cabinet 174 having a number of drawers 176. The top drawer is shown open to display two shelves 2, positioned back-to-back in each drawer. A separator 177 serves to separate the two shelves and to align cards 8. Stationary selectors 10 are positioned one opposite each shelf 2 along the front face of the cabinet, with the code vanes 14 protruding towards the coded edge of the cards. The code vanes 14 are positioned according to an address preferably by means of a typewriter as has been described in accordance with the second embodiment of the invention. One typewriter may be connected in parallel to each drawer of several cabinets. As the operator opens the drawer of the cabinet the cards 8 effectively pass over the selector head 10 so that particular cards 11, coded in accordance with the required address, are being displaced sidewise from the rest of the deck of cards 8, and therefore can be picked up by the operator. In this case, each drawer is assigned to a particular classification of cards so that the operator knows which drawer to open. It is also possible to have all selector heads electronically movable inside each cabinet so that after the desired combination is set all the selectors move from the front of the cabinet to the rear of the cabinet or in an opposite direction. Light beams, not shown, inside the cabinet can then be interrupted by the displaced cards, causing a light to be turned on on the face of the particular drawer. The operator can thus be guided as to which drawer to open.

Figure 14:
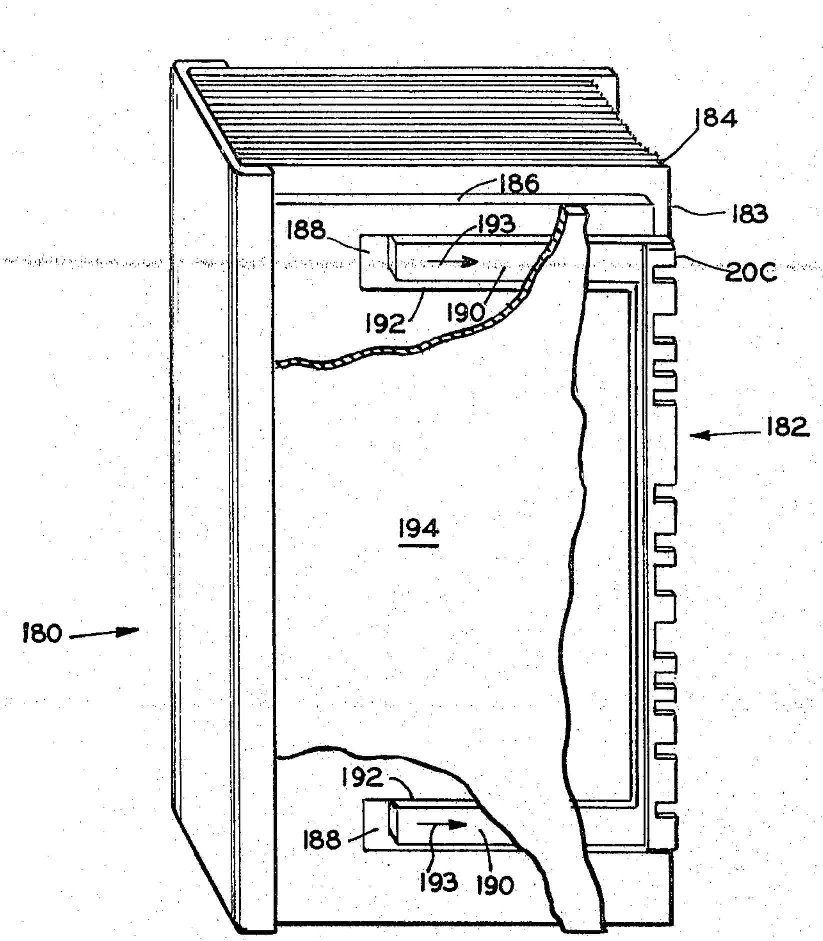
FIG. 14 is a perspective view of a coded card insert which may be used in conjunction with any embodiment or species of the invention outlined herein for the random filing and retrieval of heavy items.

In the examples described hereinbefore the invention was directed to random filing and retrieval of coded cards. The principle of the invention can, however, be extended for the random filling and retrieval of heavier items such as folders, books, boxes and other such items. FIG. 14 shows how a heavy item 180 may be retrieved by the same selector head as previously described. Instead of displacing the entire heavy item by the selector magnets, the invention provides for a coded insert 182, loosely held on one side of the heavy item 180. Assuming that FIG. 14 shows a book or a folder containing documents, one of the items 180 comprises a relatively hard sheet 184 onto which is rigidly attached a third sheet 194. The sheet 186 comprises channels 188 extending normally to the outer edge 183 of the item 180 into which tongue-like extensions 190 of the coded insert 182 may be loosely supported. Thus the channels 188 are made to provide rigid spaces by means of which a coded insert 182 having tongue-like extensions 190 may be loosely supported and permitted to slide outwardly towards the edge 182 as shown by the arrows 193. The heavy items 180 can then be filed as previously described instead of cards. When a selector head 10 having a setting of blades 14 corresponding to the combination of notches of the insert 182 passes along the edge 183 of the heavy items, a ferromagnetic strip 20C of the inert 182 will be attracted by the magnets of the selector head and will be displaced outwardly thus making the position of the heavy item obvious to the operator. It may be noted that the rigid channels 192 covered by the rigid cover sheet 194 prevent side compression of the insert 182 by the heavy items adjacent to the desirable items. For this reason the insert 182 does not experience any friction even though the heavy items may be closely squeezed against each other.

Various changes in the form and relative arrangements of the parts, which will now appear to those skilled in the art may be made without departing from the scope of the invention. Reference is, therefore, to be had to the appended claims for a definition of the limits of the invention.

What is claimed is:

1. An apparatus for random filing and retrieval of cards and the like including a plurality of cards, one edge of which contains magnetic material to be acted upon by a magnetic field and notches cut along same edge in accordance with a predetermined code and a predetermined address, comprising a shelf on which said cards can be positioned so that the plane of the card is substantially normal to a horizontal base of said shelf while the coded edge of the card having also the magnetic material is positioned on the outside portion of said shelf, a selector head movable along the length of said shelf, said head including a plurality of code blades positioned adjacent to the code notches of said cards to match the address of a desired card, said selector head also including magnets located adjacent to the edges of said cards for exerting an attractive force on the magnetic material of said cards, code setting means for positioning the code blades to match a desired code address, means for holding said selector head substantially parallel to the plane formed by the coded edges of said cards and means of moving said selector head along the length of said shelf, whereby as the cards opposite the magnets are attracted by the magnets, only the cards containing notches opposite the positioned code blades are displaced outwardly towards the selector head, while the cards whose combinations contain a solid edge portion opposite to the positioned code blades are being held from displacement by the positioned code blades of said selector head.

2. The structure of claim 1 further comprising a plurality of said shelves stacked parallel for supporting groups of cards and each of said shelves spaced from one of said selector heads.

3. The structure of claim 1 further comprising a rotary file means for supporting a plurality of said shelves on which said cards are positioned and thereby presenting a plurality of groups of cards, each group supported on each shelf.

4. The structure of claim 1 further comprising a filing cabinet having drawers each operably supporting one of said shelves on which said cards are vertical and side frame means on said filing cabinet supporting a selector head adjacent to each drawer whereby when a drawer is opened the cards move past said selector head for displacing cards set for selection within said selector head.

5. The apparatus in claim 1 further characterized in that said code setting means comprise rack gears for rigidly supporting the code blades, pinion gears for positioning said rack gears at discrete positions vertically along the coded edge of said cards, shafts for supporting and rotating said pinion gears, knob means for rotating said shafts, detent action means for restricting the rotation of said shafts to predetermined angles and means for displaying an alphanumeric identification of the discrete positions of the code blades introduced by said shafts.

6. The apparatus in claim 1 further characterized in that the code setting means includes means for addressing said cards in a base greater than two, thus supplying a large number of independent combinations, while operably requiring only a small number of notches cut along the edge of said cards for addressing a card and operably requiring a small, predetermined number of code blades for selecting one or more cards having a desired code address.

7. The apparatus described in claim 1 further characterized in that the code setting means for addressing said cards comprises multiple fields, each introduced by predetermined frequently-occurring characteristic letters, the beginning of a word also being considered a characteristic letter, each field comprising a plurality of code elements each assigned to a predetermined alphanumeric group, the letters contained in descriptor words are distributed over the multiplicity of fields on the basis of which characteristic letter is preceding each word letter, so that the resulting code combinations are not only based on the presence of a particular set of word letters but also is based on the sequence of the word letters with respect to the characteristic letters preceding them.

8. The apparatus described in claim 1 further characterized in that said code setting means comprises a typewriter keyboard for insertion of a code address in the apparatus, a plurality of field setting means each introducing a particular field when a predetermined charactersitic letter is being typed, field retaining means for retaining said introduced field until another chaarcteristic letters is typed whereby another field is introduced, a separate set of protruding slider means corresponding to each field and activated by each field setting means, swinging means corresponding to other letters, said swinging means acting on a single one of said activated set of protruding sliders, field canceling means for the cancellation of one field when a different characterstic letter is typed, slot means for engaging said slider means with the code means, solenoid means for activating said field setting means and said swinging means, whereby when said swinging means acts on said activated protruding means a vane corresponding to a particular field and a particular group consonant is rotated towards said coded cards, means of catching the displaced code blades and means of canceling and repositioning the rotated code blades after selection of the desired cards.

9. In a random access storage system a coded attachment device comprising a board having means for retaining documents and the like, said board operably supporting a channelled structure for providing sliding spaces, a coded card-like element including sliding extensions loosely supported by the walls of said channelled structure, electromagnetic material for attractively interacting with a magnetic field attached on spots along the outer edge of said card-like element, notches cut on the edge of said card-like element according to a predetermined code and a predetermined address means of retaining said card-like element within said channelled structure, whereby said channelled structure prevents undue pressure and resulting friction being applied on said card element by similar units filed in its proximity, therefore retaining said card-lke element from being displaced outwardly from its normal position with the exertion of relatively small force whenever the combination of said notches coincides with a desired combination.

References Cited

UNITED STATES PATENTS

| | | | |
|---|---|---|---|
| 3,199,674 | 8/1965 | Kalthoff | 209—80.5 |
| 3,273,567 | 9/1966 | Smitzer | 209—80.5 |

RICHARD A. SCHACHER, Primary Examiner

U.S. Cl. X.R.

209—111.8